Inventor
Ray H. Gill
By Willis F. Avery
Atty.

March 2, 1948. R. H. GILL 2,437,191
UPSETTING TOOL FOR HOLLOW RIVETS
Filed Dec. 24, 1941 4 Sheets-Sheet 2

Inventor
Ray H. Gill
By Willis F. Avery
Atty.

March 2, 1948.  R. H. GILL  2,437,191
UPSETTING TOOL FOR HOLLOW RIVETS
Filed Dec. 24, 1941  4 Sheets-Sheet 3

March 2, 1948.  R. H. GILL  2,437,191
UPSETTING TOOL FOR HOLLOW RIVETS
Filed Dec. 24, 1941  4 Sheets-Sheet 4

Inventor
Ray H. Gill
By Willis F. Avery
Atty.

Patented Mar. 2, 1948

2,437,191

UNITED STATES PATENT OFFICE 2,437,191

UPSETTING TOOL FOR HOLLOW RIVETS

Ray H. Gill, Akron, Ohio, assignor to The B. F. Goodrich Company, New York, N. Y., a corporation of New York Application December 24, 1941, Serial No. 424,297

13 Claims. (Cl. 218—19)

This invention relates to tools for upsetting hollow internally threaded rivets and is especially useful for inserting and upsetting rivets of the hollow internally threaded type shown in Waner Patents Nos. 2,149,199 and 2,188,422.

In the manufacture, repair, and alteration of airplanes and other structures having walls of sheet material, it is often desirable to provide means for applying upsetting pressure axially of the rivet from one side of the wall, as where the opposite side is inaccessible.

As the upsetting of such rivets requires considerable force, and for uniformity of riveting and security of fastening it is desirable that the rivets be upset uniformly and accurately without fatigue of the operator, it has been proposed to provide power operated tools for this purpose. Such tools heretofore have been of intricate construction and have developed structural weaknesses, requiring frequent repairs, their cost has been necessarily high because of their intricate construction, and injury to the work has resulted due to improper operation. Tools as proposed heretofore have had means for moving a draw rod or mandrel longitudinally with respect to a stationary anvil for holding against the flanged head of the rivet. As the draw rod, when inserted in the rivet, has been out of the operator's sight, it has been difficult with such tools for the operator to determine that the tool has operated properly in the upsetting operation. Also in some cases it has been difficult to mount the rivet on the rod prior to inserting the rivet in the aperture in the wall and therefore difficult to operate in close places. Damage to the wall or to the rivet or both has sometimes occurred because of objectionable rotation of the improperly seated rivet.

The present invention aims to overcome the foregoing and other difficulties and to provide a tool of improved construction and operation.

The principal objects of the invention are to provide a tool in which the movements of the rivet-upsetting parts are visible to the operator, to provide power operated manipulation of the anvil, to provide for use of lower operating pressures, to provide positive operation, to provide for conveniently mounting the rivet on the tool before entering the rivet in the wall aperture, to provide a longitudinally movable but non-rotatable anvil structure, to provide improved adaptation to different operating mechanism, to provide positive declutching where one power unit is employed for both rotative and retractive movements, to provide a more rugged construction, to provide for easy replacement of parts, and to provide speed of operation and low cost.

These and other objects will appear from the following description and the accompanying drawings.

In accordance with the invention, a rotatable rod having a threaded end for engaging the threads of a rivet is provided to extend through an aperture in an anvil, means are provided for rotating the rod and preventing rotation of the anvil while a rivet is placed on the projecting threaded end of the rod, and means are provided for advancing the anvil relative to the housing in sight of the operator while the rod is restrained against longitudinal movement to upset the rivet. In addition to making possible operation in sight of the operator, the provision for relatively advancing the anvil, as distinguished from merely retracting the mandrel, provides further advantages, including simplification of mechanism and reliability of operation. In one form of the invention both the rotative movement of the rod and the relatively advancing movement of the anvil are provided by a single driving means, operated for example by compressed air, while in a modified form of the invention these movements are accomplished by separate motors which may be operated from a single control means by a single source of pressure fluid.

Referring to the drawings, and first to Figs. 1 to 5 thereof, the numeral 10 designates a motor housing, the motor having a shaft 11 adapted to be rotatably driven in either direction. This motor may be operated by electricity or by fluid pressure, an air-operated motor being illustrated and preferred because it may be stalled without damage. Compressed air is supplied thereto from a flexible hose connected to an inlet nipple 12, and may be controlled by a valve operated by a lever 13 which in one position, indicated by the letter R, operates the shaft 11 in a right-hand direction, in another position, indicated by the letter L, operates the shaft in a left-hand direction, and in an intermediate position, illustrated in Fig. 1, shuts off the fluid pressure supply. The motor housing has a threaded reduced end 14 to which is secured a cylindrical housing 15 having a correspondingly threaded socket 16. The shaft 11 driven by motor 10, or otherwise, has threaded engagement with an extension, and for this purpose is formed with a reduced spindle 17 threaded to engage an extension or quill shaft 18 rotatably and slideably mounted within the housing 15. The quill shaft is internally threaded, as at 19 to fit the threaded spindle 17 of the driving shaft. The shaft 11 is restrained against end movement with relation to the other, non-rotative parts of the motor and the housing 15 by suitable bearings (not shown). To provide for a strong grip between the ends of the shaft 11 and the quill 18, a washer 20 of a compressed vulcanized fiber, or similar material having a high coefficient of friction against metal, may be inserted between the shafts about the spindle.

Figure 1:
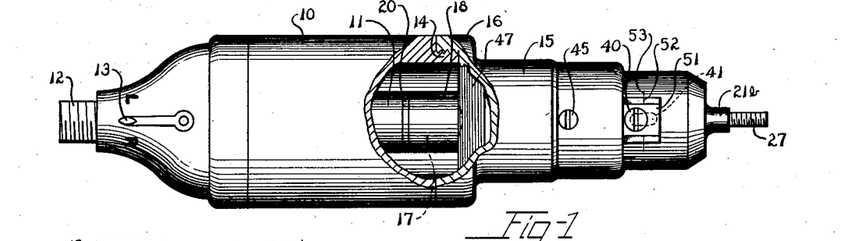
Fig. 1 is a plan view of a rivet upsetting tool constructed in accordance with and embodying the invention, parts being broken away.

An anvil 21 for engaging the flange of a rivet 28 is slidably and non-rotatably fitted in the outboard or right end of housing 15 as seen in Fig. 1, and is provided with an outwardly directed radial flange 22 at its innermost end. An inwardly directed radial flange 23 is formed at the outboard end of housing 15 and a compression coil spring 24 is compressed between the flanges in an annular cavity 25 therebetween and about the anvil. The anvil has an axial bore which slidably fits over a rivet engaging rod 26 rotatably and slidably journaled therein. The rod is threaded at its outer end, as at 27 to engage the threaded bore of the rivet 28. The opposite end of the rod is secured in the axial bore of a chuck 29 as by threads 30 and a set screw 31. The chuck 29 is slidably mounted in the bore of the quill 18. To lock the chuck against rotation with respect to the quill, a cross-pin 32 is fixed through the chuck with its ends extending radially through axial slots 33, 34, formed through opposite sides of the quill 18. The arrangement is such that the rod 26 must rotate with the quill 18, but one may be moved axially of the other within the limits of the slots. Movement of the rod 26 outwardly of the housing is further limited by a shoulder 35 provided by a bushing 36 of hardened steel fixed in the housing 15 between the cross-pin 32 and the outboard end of the housing in the path of movement of the radially projecting ends of the crosspin.

Figure 2:
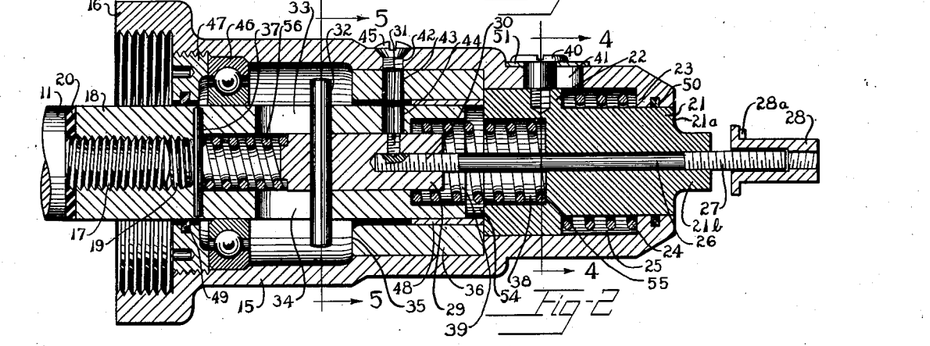
Fig. 2 is a longitudinal sectional view of the operating head thereof with the parts shown in the position for engaging a rivet before the upsetting operation takes place, other parts being broken away.

A compression coil spring 56 is located in the bore of the quill 18 between a cross-pin 37 extending across the bore and the inner end of chuck 29 to urge the rod 26 to its outermost position with relation to quill 18. Another compression coil spring 55 is mounted between the quill 18 and the anvil 21 to provide constant frictional drag on the quill 18. The anvil is chambered as at 38 to seat one end of the spring and the quill is formed with a counterbore 39 to seat the other end thereof.

Turning of the anvil is prevented by a screw 40 projecting radially therefrom through an axial slot 41 in the housing 15. To provide for replacement of the rod 26, aligned openings 42, 43, 44 may be formed in the wall of the housing 15, the bushing 36, and the quill 18 respectively over the screw 31, and a screw plug 45 may be provided to close the opening 42.

Where the shaft 11 is rotatably supported immediately adjacent its screw connection to the quill, the quill may be supported also for rotation thereby, but for additional independent support of the quill a ball bearing 46 may be provided within the housing and surrounding the quill. A lock ring 47 may be provided for holding the bearing in place so that the outer race is fixed to the housing while the quill is free to slide through the inner race. A slip sleeve 48 may also be provided between the quill 18 and the bushing 36. Felt dust excluding rings 49, 50 may be provided between the lock ring 47 and the quill 18 and between the nose of the housing 15 and the anvil 21 respectively.

To provide indicating means for showing the position of the operating parts, the anvil 21 is constructed with an outer face 21a which will be flush with the nose of the housing 15 when the anvil is at its retracted position. Additional means for this purpose is provided by an arcuate plate 51 having sliding engagement with the housing 15 over the slot 41 and fixed to the anvil by the screw 40 which extends therethrough. An index mark 52 on the scale indicates the position of the anvil relative to an index mark 53 on the housing. The anvil 21 is preferably formed with a nose 21b of reduced diameter which extends beyond the face 21a so as to provide a better view of the rivet and to permit use of the tool in crowded spaces, and longer noses and rivet-engaging rods than those shown may be employed when necessary.

The motor employed is preferably one that will not be injured by stalling of the upsetting mechanism and any motor having means for preventing injury thereto because of such stalling may be employed, or the shaft 11 may be the terminal portion of a rigid or flexible shaft driven from any power source through a clutch adapted to slip during a stall.

The reduced spindle 17 of the motor shaft is formed with a left-hand thread which engages a corresponding thread 19 in the bore of the quill shaft so that rotation of the motor shaft in a clockwise direction, as seen when looking from the right in Fig. 2 will rotate the quill 18 and consequently the chuck 29 and rod 27 in the same direction.

In considering relative movements of the parts in the operation of the apparatus it is convenient to regard the housing 15 of the tool as being stationary in space so that the anvil 21 is regarded as moving in space with respect to the housing. This is the actual condition in some cases encountered in practice where the work is light and movable so as to be capable of being readily pushed away from the operator in the upsetting operation. In the case where the work is fixed it will be understood that some parts of the tool including the housing 15 and rod 26 will be compelled to move back from the work during the upsetting in manifesting the relative movement between the anvil 21 and the housing 15 while the anvil 21 remains against the rivet in the fixed work. The action in upsetting the rivet is however essentially the same in the two cases.

The operation of the apparatus is as follows, regarding the housing 15 as stationary. With the parts as shown in Fig. 2, a rivet is held, preferably by the hand of the operator, against rotation while holding it against the end of the rod 26, and the shaft 11 is rotated in a counter-clockwise direction as seen when looking from the right of Fig. 2. Shaft 11, through the friction washer 20, rotates with it sleeve or quill 18 (despite the drag of spring 55), chuck 29 and rod 26, and thereby the rivet, which has right hand threads, is threaded onto the rod until it impinges against the anvil 21. At this position the parts of the apparatus are in the same positions as in Fig. 2 while the rivet is in contact with anvil 21. Due to the pull resulting from pressure between the head of the rivet and the non-rotating anvil, the rod 26 will be placed under tension. When the rivet by impingement against the anvil 21, tensions rod 26, a condition apparent to the operator by increased load on the drive shaft, indicated by feel of the casing against the hand and by sound of operation and cessation of tendency to rotate on the part of the rivet, the operator, to avoid collapse of the rivet before entry thereof in the work, may stop rotation of the drive shaft and enter the shank of the rivet in the aperture of the part to be riveted and restart the motor in the same direction. In the case where the rivet has been inserted in the work at the start of the operation, such stopping of rotation is unnecessary.

Upon the resumption or continuation of rotation of the driving shaft 11, the rotation of rod 26, together with the chuck 29 and quill 18, is slowed down and brought to a stop. This slowing down of the rod 26, chuck 29, and quill 18 results because the tension on rod 26 resulting from the friction of the rivet against the anvil 21, combined with the drag of the spring 55 against the turning quill 18 and bearing friction, overcomes the friction of the disc 20. Once the clamp of quill 18 to spindle 17 by friction disc 20 has been overcome, the drag of spring 55 begins to have some effect on holding quill 18 against rotation but does not completely stop its rotating so that there results simultaneous rotation of quill 18 with spindle 17 and advance of quill 18 along spindle 17 so that the relative rotation of the driving shaft 11 and the quill 18 is accompanied by an advance of the quill by virtue of the threaded engagement of the threaded spindle 17 in the threads 19 of the quill. This advance of the quill is accompanied by an advance of the cross-pin 32 under the influence of spring 56 against chuck 29 in which the pin 32 is mounted, and, while the compression of spring 55 causes decelerating rotation of the quill 18, rotation of chuck 29 and rod 26 continues to thread the rod into the rivet, until the pin 32 abuts the sleeve 36 and stops the rotation of the quill, chuck and rod. The rod has now advanced as far as it can into the rivet.

The rivet is held against rotation by the keyed connection 28a of the rivet to the work, although the friction of the rivet against the work ordinarily is sufficient to prevent such rotation, and the key is not essential in all cases.

Figure 3:
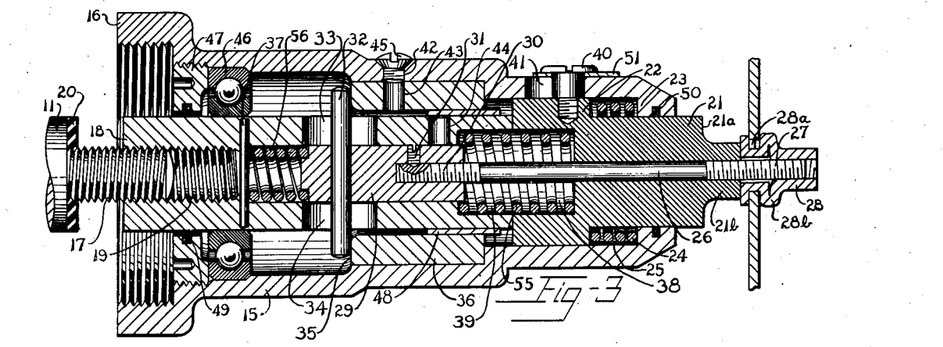
Fig. 3 is a similar view showing the position of the parts at the end of the rivet upsetting operation.
Figure 4:
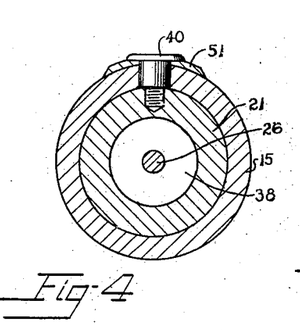
Fig. 4 is a cross-sectional view taken on line 4—4 of Fig. 2.
Figure 5:
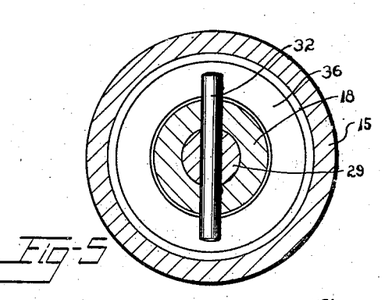
Fig. 5 is a cross-sectional view taken on line 5—5 of Fig. 2.
Figures 6, 7:
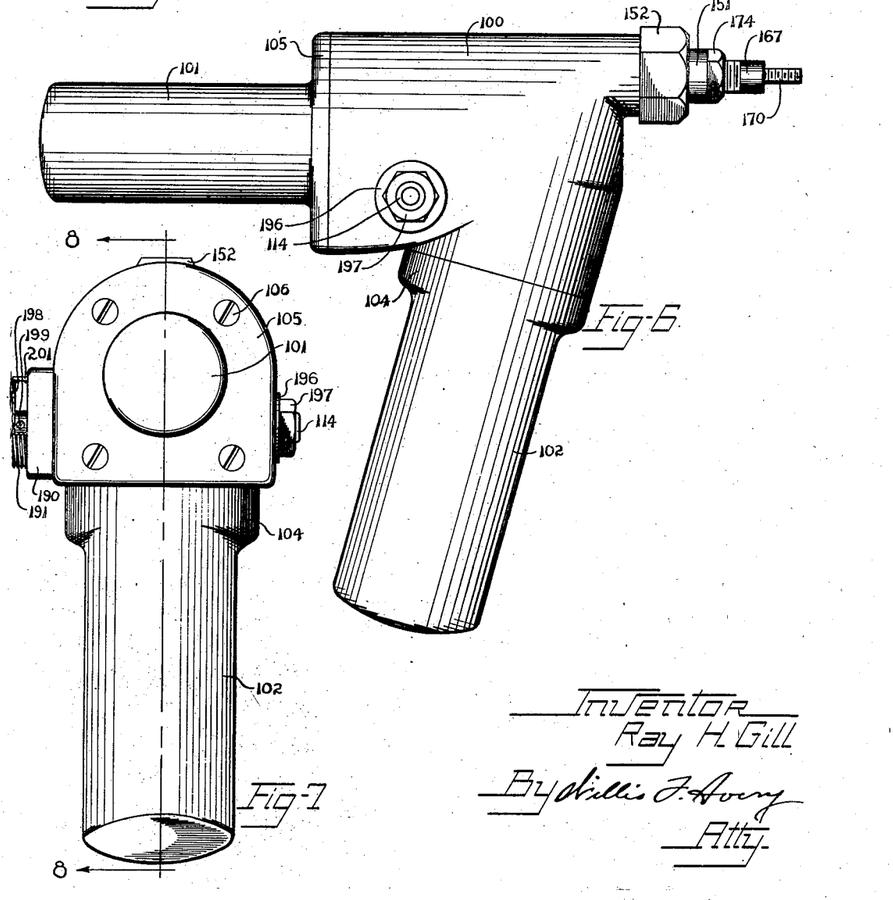
Fig. 6 is a side elevation of a modified form of tool embodying the invention.
Fig. 7 is a rear elevation thereof.

Further advance of the quill 18 by virtue of its threaded connection with the rotating spindle 17 brings it into contact with the anvil, closing space 54, and forces the anvil in the direction of the rivet, as seen in Fig. 3, upsetting the rivet between the moving anvil and the rod 26 which is now longitudinally stationary with respect to the housing, forward movement of the rod 26 and the chuck 29 having been stopped by the engagement of pin 32 with shoulder 35 of bushing 36 as above explained. After the rivet is upset, further forward movement of the anvil with respect to the rod 26 is prevented by the jamming of the upset rivet or because further forward movement of the anvil with respect to the housing is prevented by engagement of the screw 40 with the housing at the end of the slot 41, and the motor stalls due to the sudden increase in torque.

The operator then starts the motor in the opposite direction to drive shaft 11 in a clockwise direction as seen from the right in Fig. 2. The friction of the quill 18 against the anvil 21, the drag of the spring 55, the friction of the threaded rod 26 in the rivet, and the friction of pin 32 against bushing 36 are collectively greater than the friction of the threads of the spindle 17 in the threads of the quill 18, and therefore the quill 18 is held against rotation while the spindle 17 rotates in the quill thus withdrawing the quill 18 to the position of Fig. 2 where the friction washer 20 becomes clamped between the shaft 11 and the quill 18. Thereafter the quill 18 rotates with the spindle 17 and with it the chuck 29 and rod 26 are rotated in a clockwise direction as seen when looking from the right of Fig. 2, unscrewing the rod 26 from the upset rivet. The motor is then stopped leaving the parts in the position of Fig. 2 ready for the application of another rivet and a new cycle of operation.

Referring to the form of the invention shown in Figs. 6 to 13, a housing 100 is provided, to which are secured two fluid pressure cylinders 101, 102. Cylinder 102 is secured to the housing with which it communicates, by screw threads 103 engaging similar threads in the housing, a shoulder 104 being provided on the cylinder to be drawn against a face of the housing to provide a tight joint. Cylinder 101 has a flange 105 which is clamped against the housing around an aperture thereof by screws 106. Cylinder 102 has a tubular liner 107 in which a piston 108 is slidably fitted. Sealing rings 109 are provided in annular grooves of the piston to seal the joint.

Cylinder 101 also has a liner 110 fitted therein, and a piston 111 having sealing rings 112 is slidably fitted therein. An enclosed cavity 113 formed in the housing and communicating with the open ends of cylinders 101, 102 constitutes a third pressure chamber for actuating the pistons 108, 111 between which it is operatively located.

Movement of the pistons, under the influence of fluid pressure is controlled by a single valve member 114 of conical form rotatably fitted in a conical seat 115 formed through a solid wall of the housing 100.

Valve member 114 is formed with an axial supply passage 116 at its larger end and an axial exhaust passage 117 at its opposite end separated from each other. A radial port 118 is formed in the wall of the rotatable valve member communicating with the passage 116 and two radial ports 119, 120 are formed in the wall thereof in communication with passage 117. Ports 118, 119 and 120 are equally spaced circumferentially from each other and port 118 is in a radial plane axially spaced from a radial plane in which ports 119, 120 are located. Three axially extending grooves 121, 122, 123 are formed in the conical seat 115 of the housing 100 equally spaced from each other.

The grooves terminate short of each end of the valve seat but are long enough for each groove to communicate with each valve port by rotation of the valve. Cylinder 101 has a port 124 at its closed end through its liner, communicating with a groove 125 formed between the liner and the cylinder wall and extending lengthwise of the cylinder. Groove 125 connects through a groove 126 in the face of the flange 105 and with a passage 127 through the housing with groove 122.

Cylinder 102 has a port 130 at its closed end which connects by way of a passage 131, and a passage 132 with a groove 133 formed longitudinally of the cylinder back of its liner and extending to near the open end of the cylinder where it communicates with a passage 134 which connects it to groove 121.

Groove 123 is connected by passages 140 and 141 with a recess 142 in the face of the housing 100 and a passage 143 in a plate 144 over the recess communicates with the open end of cylinder 101. A passage 145 also connects passage 140 to cavity 113 of the housing which is open to the open end of cylinder 102. The arrangement is such that with the valve member 114 in the position shown in Figs. 8 and 9 fluid under pressure supplied to passage 116 of the valve enters port 118 and travels sequentially through groove 121, passage 134, groove 133 and passages 132, 131, and port 130 to the lower end of cylinder 102, raising the piston 108, as seen in Fig. 8, and at the same time the left end of cylinder 101 is opened to exhaust passage 117 and the atmosphere sequentially through port 124, grooves 125 and 126, passage 127, groove 122 and port 120, and housing cavity 113 which communicate with the open end of cylinder 102, is also opened to exhaust through passage 145 sequentially through passages 140, groove 123, and port 119, the right end of cylinder 101, as seen in Fig. 8 being also opened to exhaust by passage 143 and sequentailly through recess 142 and passages 141, 140, groove 123, and port 119 to passage 117 and the atmosphere.

Figures 8, 9, 10:
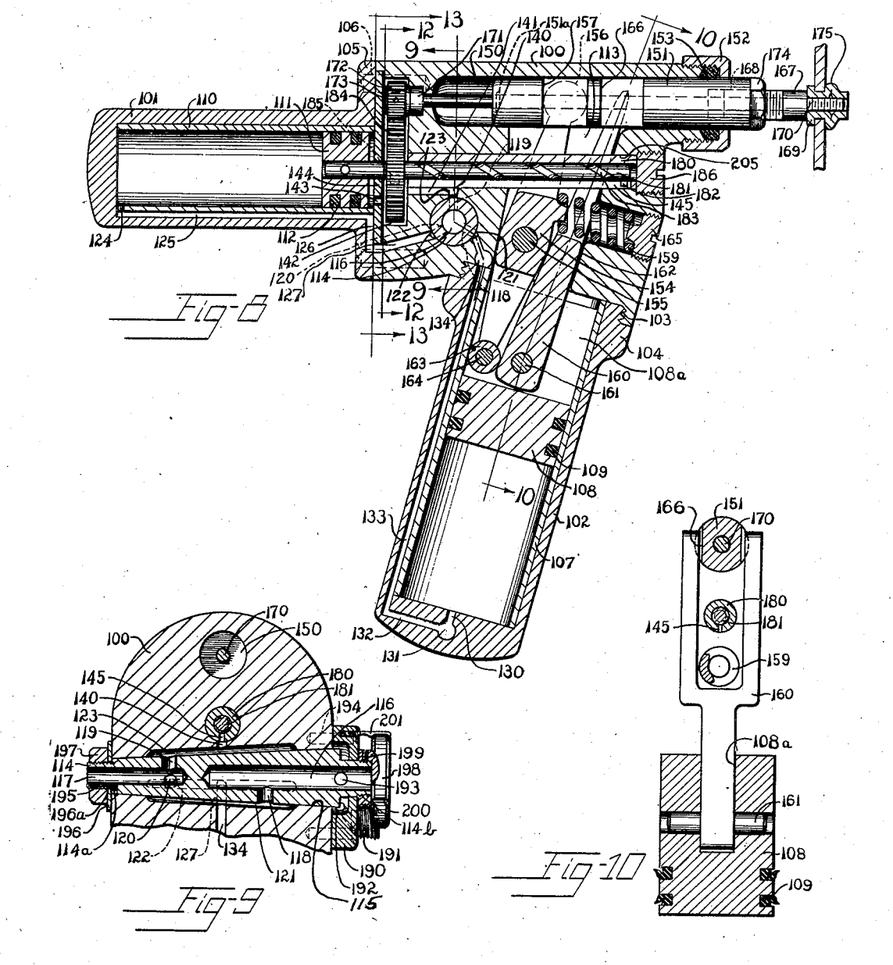
Fig. 8 is a longitudinal section thereof taken on line 8—8 of Fig. 7.
Fig. 9 is a sectional view of the valve taken on line 9—9 of Fig. 8, parts being broken away.
Fig. 10 is a cross-sectional view of the anvil operating piston and associated parts, taken on line 10—10 of Fig. 8.
Figure 11:
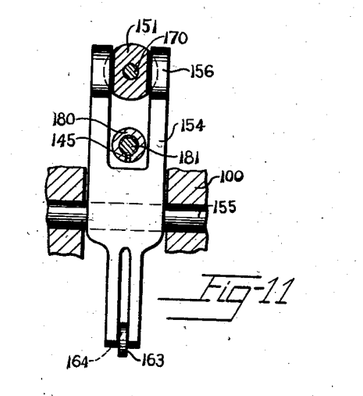
Fig. 11 is a detail view of the anvil-pressing lever.
Figure 12:
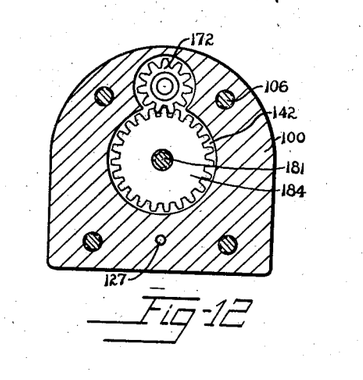
Fig. 12 is a sectional view taken on line 12—12 of Fig. 8.
Figure 13:
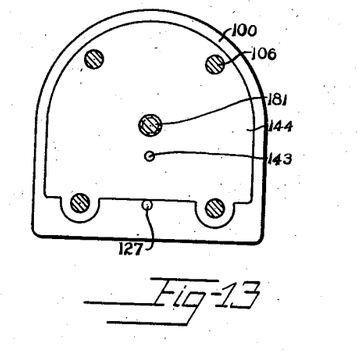
Fig. 13 is a sectional view taken on line 13—13 of Fig. 8.
Figure 14:
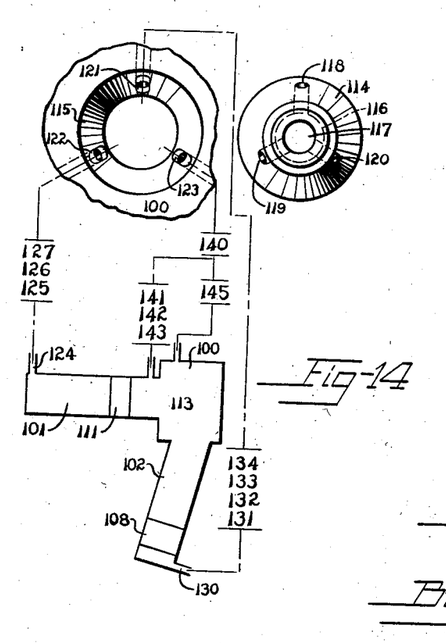
Fig. 14 is a diagram of the valve and its connections.

By rotation of valve member 114 in a counter-clockwise direction, as seen in Fig. 8, or counter-clockwise as to the valve and clockwise as to the seat as shown in Fig. 14, through an angle of 120°, fluid pressure will be supplied from passage 116 through port 118 to groove 123 and by way of passages 140, 141, 142, 143 to the right end of cylinder 101, and also from passage 140 through passage 145 to the cavity 113 and the open end of cylinder 102, while at the same time the left end of cylinder 101 will be opened to exhaust through port 124, sequentially through groove 125, passage 126, 127, groove 122 and port 119 to passage 117, and, the atmosphere, and the lower end of cylinder 102 will be connected to exhaust through port 130 sequentially through passages 131, 132, groove 133, passage 134, groove 121, and port 120 to passage 117 and the atmosphere so that piston 111 will be driven to the left in Fig. 8 and piston 108 will be lowered simultaneously.

In a third position of valve member 114 attained by further rotation thereof through a second angle of 120° in a counter-clockwise direction in Fig. 8, fluid pressure will be supplied from passage 116 through port 118 to groove 122 and by way of passage 127 grooves 126 and 125 and port 124 to the left end of cylinder 101, while at the same time the lower end of cylinder 102 will be opened to exhaust through port 130 and sequentially through ports 131, 132, groove 133, passage 134, groove 121, port 119 and passage 117 to the atmosphere and the cavity 113 will be opened to exhaust by way of passage 145 and sequentially through passage 140, groove 123, port 120 and passage 117 to the atmosphere, and the right end of cylinder 101 will be opened to exhaust sequentially through passage 143, recess 142, passages 141, 140, groove 123, port 120 and passage 117 so that piston 111 will be moved to the right in Fig. 8 while the piston 108 will remain stationary.

The housing 100 is formed with a cylindrical bore 150, which opens at its lower side into the recess 113. A cylindrical plunger 151 is slidably mounted in the bore 150, a packing gland 152 being threaded on the housing at the mouth of the bore to compress a packing 153 about the plunger and prevent escape of pressure fluid thereabout to the atmosphere. A packing 151ª may also be provided around rod 170 in the end of plunger 151.

A lever 154, of the first class, is pivoted on a pin 155 fixed in the housing 100. One end of the lever is bifurcated and its ends 156 are rounded so as pivotally to engage in slots 157 at opposite sides of the plunger. The arrangement is such that rotation of the lever on pivot pin 155 moves the plunger 151 longitudinally and the slotted arrangement prevents its rotation. A wedge member 160 is pivotally mounted at its thick end on a cross-pin 161 fixed to piston 108, the wedge being retained in a slot 108ª in the piston across which the pin 161 passes. Housing 100 is formed with a surface 162 parallel to the axis of cylinder 102, along which wedge 160 is adapted to slide upon movement of piston 108. The lower end of lever 154 is adapted to extend into the slot 109 of the piston and has a roller 163 rotatably mounted on a pin 164 fixed to the lever. The roller is adapted to cooperate with the inclined face of the wedge 160. A coil spring 159 is retained in the recess 113 by a screw plug 165 and impinges against the upper arm of the lever 154 to rotate the lever in a counter-clockwise direction as seen in Fig. 8 and holds its roller 163 against the wedge 160.

The upper end of the wedge is bifurcated so as to clear the spring and other parts including the plunger, the plunger being formed with opposite clearance slots 166 to receive the ends of the wedge in its elevated position. The arrangement is such that when piston 108 is raised, the wedge 160 engages roller 163 and swings lever 154 clockwise about pin 155 and thus tends to force the plunger 151 to the right in Fig. 8, and when piston 108 is lowered, the spring 159 forces the plunger 151 into stock 100. Plunger 151 carries a tubular anvil 167 in a threaded counterbore 168 of its projecting portion for pressing against a hollow threaded rivet 169 to upset the same.

To provide for holding the threaded part of the rivet and the housing 100 in the same spaced-apart relation while the anvil is advanced relative to the housing to upset the rivet, a rod 170 is rotatably journaled through the bore of plunger 151, and anvil 167, and has an enlarged integral portion 171 rotatably retained in recess 142 against end movement. A pinion 172 for rotating the rod is located in recess 142, being retained on the rod by a pin 173. Rod 170 is threaded at its outer end where it projects beyond the anvil to engage the threads of the rivet and retain the rivet against the anvil. When a rivet is pressed against by the anvil 167, the rivet being on the threaded portion of the rod, the rivet is held in spaced-apart relation to the housing by the rod while the anvil is advanced along the rod and the rivet is collapsed or upset as at 175. The anvil may be adjusted in relation to the plunger to adjust it to rivets of different lengths and a lock nut 174 also being provided to hold it in adjustment. At this stage the parts are related as shown in Fig. 3.

To provide for rotating the rod 170 to engage and disengage a rivet, the housing 100 is formed with a bore 205 parallel to the axis of the plunger 151 and extending across the recess 113. A tubular guide 180 is provided as a lining for this bore, and a longitudinal slot 145 is formed through its wall on the lower side throughout its length except for a short distance at the right end of the tube as seen in Fig. 8. A piston rod 181 is fixed to piston 111 and is slideably mounted in the bore of the tubular guide 180. A pin 182 in the side of the rod extends into and is guided by the slot 145 so as to prevent rotation of the rod. The rod is formed with a helical groove 183 of great pitch with respect to its circumference, and preferably at a pitch angle of less than 45°. A gear wheel 184 is rotatably mounted in the recess 142 about the rod 181 and has a key 185 in its hub which engages in the groove 183. The gear 184 meshes with pinion 172. The arrangement is such that when piston 111 is oscillated in cylinder 101, rod 181 is drawn through the hub of gear 184 causing rotation of rod 170. Groove 183 is a right-hand helix and movement of the piston 111 toward the right as seen in Fig. 8 to the position illustrated causes the rod 170 to rotate in a right-hand direction adapted to screw the rod 151 into the rivet which has a right-hand thread, and movement of the piston to the left causes the rod to release the rivet. A screw plug 186 engages in a threaded opening in the housing 109 and holds the tubular guide 180 in place.

For supplying fluid under pressure to the valve, a plate 190 is secured against the housing 100 about the valve 114 and has a tubular inlet 191 threaded to receive a hose coupling. A passage 192 is formed in its housing-contacting face and connects the inlet with the space 116 of the valve member through radial ports 193 formed in the valve member and communicating constantly with the passage 192 which surrounds the valve stem. Screws 194 hold the plate 190 in sealed relation to the housing 100. The small end of the valve member 114 is threaded as at 195 and has an axial keyway 114ª. A washer 196 surrounds the threaded end in contact with the housing 100 with a key 196ª thereof entering the keyway 114ª. A threaded nut 197 engages the threads of the valve member over the washer and may be used to adjust the seating of the valve. The opposite end of the valve member is also threaded as at 114ᵇ to engage a knob 198, having a threaded bore. A set screw 199 threaded through the hub of the knob may be tightened to hold the knob in position. The knob may be formed with notches 200 to indicate the positions of its ports and a spring index finger 201 may be provided on the plate 190 to engage one of the notches frictionally at a position where the valve ports are in alignment and to act as an indicator.

As in the case of the description of the operation of the embodiment first described, it is convenient in considering the operation of the embodiment of Figs. 6 to 14 to regard the housing 100 of the tool, rather than the work, as fixed, so that relative movements will be manifested as movements in space of the anvil 167 and other operating parts within the housing. However, in the case where the work is fixed it will be understood that the anvil 167 remains against the rivet in the work and the relative movement between the anvil 167 and housing 100 during the upsetting will be manifested as a rearward movement of the housing 100 and rod 170, the essential action being the same in the two cases. The operation of the apparatus is as follows: The operator holds the tool by the cylinder 102 with his right hand with the anvil 167 away from him and the threaded rod 170 against the threaded aperture of a tubular threaded rivet 167, the valve member 114 being at its inactive position, that is the position where its port 118 is in register with groove 123. In this position of the valve air under pressure enters from hose connection 191 by way of passages 192, 193, 116, 118 and groove 123 through passages 140 and 145 to recess 113, thus holding piston 108 at the bottom of cylinder 102, and also by way of passages 140, 141, 142, and 143 to the inner end of cylinder 101, thus holding the piston 111 at the outer end of cylinder 101, the outer end of cylinder 101 being connected to exhaust sequentially through passages 124, 125, 126, 127, groove 122 and passages 119 and 117 to the atmosphere, and the lower end of cylinder 102 being opened to exhaust sequentially through passages 130, 131, 132, 133, 134, groove 121, and passages 120, 117 to the atmosphere.

The valve member 114 is then rotated 120° in a counter-clockwise direction as seen in Fig. 8 to bring port 118 into communication with groove 122. At this position of the valve fluid under pressure from a hose connected to connection 191 passes sequentially through passages 192, 193, 116, 118, groove 122, passages 127, 126, 125 and port 124 to the left end of cylinder 101 driving piston 111 to the right, that is, to the position shown in Fig. 8. Piston rod 181 is carried forward by the piston and is prevented from rotating by pin 182 engaging in slot 145. The piston rod slides through gear 184 which is rotated by engagement of its key 185 with helical groove 183 and rotates pinion 172 and consequently rod 170 in a right-hand direction screwing the rod into the rivet 169, movement of the piston 111 being stopped either by engagement of the flange of the rivet 169 with the anvil 167 or by the piston reaching the end of the cylinder. At the same time the right end of cylinder 101 is opened to exhaust by way of passages 143, 142, 141, 140, groove 123, passages 120 and 117 to the atmosphere, recess 113 is also opened to exhaust by way of passages 145, 140, groove 123 and passages 120 and 117, and the lower end of cylinder 102 is opened to exhaust sequentially by way of passages 130, 131, 132, 133, 134, groove 121, and passages 119 and 117 to the atmosphere so that piston 108 remains stationary.

The operator then turns the valve member another 120° in a counter-clockwise direction as seen in Fig. 8 to the next valve position. In the new valve position, air under pressure from the hose connection 191 passes sequentially by way of passages 192, 193, 116, 118, groove 121, and passages 134, 133, 132, 131, 130, to the lower end of cylinder 102, and recess 113 is opened to exhaust sequentially by way of passages 145, 140, groove 123, and passages 119, 117 to the atmosphere, so that piston 108 is driven upwardly carrying wedge 160. Wedge 160 causes lever 154 to swing in a clockwise direction, as seen in Fig. 8, by contact with roller 163 thus pushing plunger 151 and anvil 167 forward with relation to the housing 100, the threaded part of the rivet being held by the rod 170 against movement with relation to the housing. At the same time, piston 111 remains stationary relative to the cylinder 101 at the right hand end thereof the left end of cylinder 101 being opened to exhaust sequentially through passages 124, 125, 126, 127, groove 122, and passages 120, 117 to the atmosphere and the right end of the same cylinder is open to the atmosphere sequentially by way of passages 143, 142, 141, 140, groove 123, and passages 119, 117.

After the rivet has been upset, the operator turns valve member 114 in a counter-clockwise direction, as seen in Fig. 8, through an angle of 120° to a position where port 118 again registers with groove 123. In this position, air under pressure enters connection 191 sequentially by way of passages 192, 193, 116, 118, groove 123, and passages 140, 145 to chamber 113 and thence to the top of the piston 108 and also by way of passages 140, 141, 142, 143 to the right end of cylinder 101, while at the same time the left end of cylinder 101 is opened to exhaust sequentially through passages 124, 125, 126, 127, groove 122 and passages 119, 117, and the lower end of cylinder 102 is opened to the atmosphere sequentially through passages 130, 131, 132, 133, 134, groove 121, passages 120 and 117, resulting in return of piston 108 to the lower end of cylinder 102 and return of piston 111 to the left end of cylinder 101, causing the rod 170 to rotate in a counter-clockwise direction to unscrew it from the rivet, while, at the same time plunger 151 and anvil 167 are withdrawn into housing 100.

The anvil is in full sight of the operator at all times. The rod 170 may be replaced by removing screws 106, cylinder 101, and plate 173.

Variations may be made without departing from the scope of the invention, as it is defined by the following claims.

I claim:
1. Apparatus for upsetting a hollow threaded rivet, said apparatus comprising a mandrel having a threaded portion engageable in the threaded bore of the rivet, an anvil engageable with the rivet, a support for the mandrel and the anvil, the anvil being movable with relation to said support and along the mandrel, resilient means urging said anvil with relation to said support in a direction away from the threaded end of said mandrel, and means for moving said anvil in the opposite direction against said resilient means to upset a rivet engaged by the threaded end of said mandrel.

2. Apparatus for upsetting a hollow threaded rivet, said apparatus comprising a mandrel having a threaded portion engageable in the threaded bore of the rivet, means for rotating the mandrel to engage and disengage the rivet, an anvil engageable with the rivet, a support for the mandrel and the anvil, the anvil being movable with relation to said support and along the mandrel, resilient means urging said anvil with relation to said support in a direction away from the threaded end of said mandrel and means for moving said anvil in the opposite direction against said resilient means to upset a rivet engaged by the threaded end of said mandrel.

3. Apparatus for upsetting a hollow rivet having a threaded opening, said apparatus comprising a hollow non-rotatable anvil, a rod having a threaded end slidably projecting through said anvil and formed and arranged to engage the threaded opening of the rivet, a support for said anvil and said rod, means for rotating said rod to mount a rivet thereon against said anvil, means for restraining said rod against longitudinal movement with relation to said support, means yieldably urging said anvil with relation to said rod in a direction away from the threaded end of said rod, and means for moving said anvil with relation to said rod and said support toward the threaded end of the rod and outwardly of the support against pressure of the last said means for applying an upsetting force to the rivet.

4. Apparatus for upsetting a hollow rivet having a threaded opening, said apparatus comprising a housing adapted to be held by the operator, a power driven shaft journaled therein, a non-rotatable hollow anvil slidably mounted in said housing, a rod having a threaded end projecting through said anvil to engage the threaded opening of the rivet, a member rotatably and slidably mounted in said housing, driving means on said member for supporting and slideably positively rotating said rod, said member and said power driven shaft having screw means engaging each other for manipulating said member in rotative and axial movements, means including an element on said member for engaging and moving said anvil axially with relation to said rod during an axial movement of said member in a direction toward the rivet to apply an upsetting force to the rivet secured to said rod, and means for limiting axial movement of said rod relative to said housing during the axial movement of said anvil in a direction toward the threaded end of the rod for applying the upsetting force.

5. Apparatus for upsetting a hollow rivet having a threaded opening, said apparatus comprising driving means rotatable in opposite directions, an extension member having threaded connection with said driving means and movable thereby in axial and rotative movements, a support for said driving means and said member, a threaded rod adapted to engage the threaded opening in the rivet and adapted to be rotated by said driving means and said extension member, stationary means on said support for limiting axial movement of said rod, a hollow non-rotatable anvil about said rod, and means including an element on said extension member for relatively moving said anvil axially of said rod in a direction toward the threaded end of said rod to upset a rivet thereon while axial movement of said rod with respect to said support is restrained.

6. Apparatus for upsetting a hollow rivet having a threaded bore, said apparatus comprising a housing, a rod in said housing having a threaded end projecting therefrom, means for rotating said rod to engage the threaded end of the latter with and to disengage the same from said rivet, a hollow anvil through which said rod extends, said anvil being mounted for relative movement with respect to both said housing and said rod in a direction toward said threaded end to apply an upsetting force to said rivet, and means for effecting such relative movement.

7. Apparatus for upsetting a hollow rivet having a threaded bore, said apparatus comprising a housing, a rod in said housing having a threaded end projecting therefrom, means for rotating said rod to engage the threaded end of the latter with and disengage the same from said rivet, a hollow anvil through which said rod extends, said anvil on the one hand and said support and said mandrel on the other hand being moveable one with relation to the other in a direction axial of said rod to apply an upsetting force to said rivet, a spring urging said anvil away from the threaded end of the rod, and means for moving the anvil toward the threaded end of the rod against the pressure of said spring to upset a rivet.

8. A rotary tool for upsetting internally threaded tubular rivets, comprising a rotatable driving shaft, a driven shaft having a telescopic connection with said driving shaft, the telescoping portions of said shafts being in threaded engagement to permit a relative axial movement of said shafts when one is turned relatively to the other, a friction clutch normally preventing relative turning movements of said shafts, a threaded bit movable with said driven shaft and adapted to be inserted into said tubular rivet, an anvil non-rotatable in the tool and slideable axially with respect to and surrounding said bit and adapted to abut against the tubular rivet when the rivet is advanced along said bit by the rotation of said driven shaft longitudinally of the bit into operative engagement with the anvil, a spring normally urging said anvil away from the rivet-engaging end of said bit, and means operated upon the rivet being held against rotation by engagement of the rivet with said anvil to halt rotation of said driven shaft, thereby overcoming said friction clutch to permit an axial movement of said driven shaft and said anvil to collapse said rivet against the anvil.

9. A rotary tool for upsetting internally threaded tubular rivets, comprising a rotatable driving shaft, a driven shaft, a first friction clutch between said shafts causing said driven shaft normally to turn with said driving shaft, a threaded bit movable with said driven shaft and adapted to be inserted into said tubular rivet, an anvil non-rotatable in the tool and slideable axially with respect to and surrounding said bit and adapted to abut against the tubular rivet when the rivet advances axially along said bit and is operatively engaged therewith, a spring normally urging said anvil away from the rivet-engaging end of said bit, a second friction clutch of which said anvil comprises one element interrupting rotation of said driven shaft and said bit after a relative axial movement of predetermined extent between said anvil and the rivet, said second friction clutch being adapted to overcome said first friction clutch, and means operable upon the disabling of said first friction clutch for effecting axial non-rotating movement of said driven shaft relative to said anvil, to upset the rivet by advance of said anvil relative to said bit.

10. A rotary tool for upsetting internally threaded tubular rivets, comprising a rotatable driving shaft, a driven shaft having a telescopic connection with said driving shaft, the telescoping portions of said shafts being in threaded engagement to permit a relative axial movement of said shafts when one is turned relatively to the other, a first friction clutch normally preventing relative turning movements of said shafts, a threaded bit secured in said driven shaft in axial alignment therewith and adapted to be inserted into said tubular rivet, an anvil non-rotatable in the tool and slideable axially with respect to and surrounding said bit and adapted to abut against the tubular rivet when the rivet is advanced by the rotation of said driven shaft longitudinally of the anvil into operative engagement with the anvil, a spring normally urging said anvil away from the rivet-engaging end of said bit, and a second clutch enabled by the relative longitudinal movement of said anvil and the bit for halting rotation of said driven shaft and said bit to permit a turning movement of said driving shaft relative to said driven shaft and a consequent axial non-rotating movement of said driven shaft and said bit in a direction to collapse said rivet against the anvil.

11. A power tool for installing internally threaded flanged clinch nuts comprising a housing adapted to be manually supported, an anvil non-rotatably and slidably mounted in said housing and adapted to project beyond the front end thereof, the front end of the anvil having a face adapted to seat against the flange of the clinch nut, a spring normally urging said anvil inwardly of said housing, a bit surrounded by the anvil and supported therein for relative rotary and axial movements, the front end of the bit projecting beyond the anvil and being threaded for engagement with the internal threads in the clinch nut, power operated means for imparting first rotary and then axial movement of the bit relative to the anvil for installing the clinch nut, and power operated means for imparting axial and rotary movements of the bit relative to the anvil for restoring the parts of the tool to normal condition, said anvil being movable axially relative to the housing in one direction outward of said housing against the pressure of said spring while the clinch nut is being installed and in the opposite direction while the parts are being restored to normal.

12. Apparatus for upsetting a hollow rivet having a threaded bore, said apparatus comprising a housing, a driving shaft within said housing, a driven shaft within said housing having threaded engagement with said driving shaft for effecting relative axial movement therebetween as a result of relative rotational movement thereof, a bit in driving engagement with said driven shaft having a threaded end extending beyond said housing for engaging the threaded bore of a rivet, a non-rotatable anvil surrounding said rod in sliding engagement therewith and slideably mounted in said housing, cooperating friction means in addition to said threaded engagement on said shafts for frictionally driving said driven shaft and said bit in a direction to enter the threaded end of said rod in the bore of the rivet and seat said rivet against said anvil, means effective upon contact of the rivet with said anvil and tensioning of said rod for overpowering said friction means and effecting an axial movement of said driven shaft and thereby said anvil in a direction outwardly of said housing toward the rivet, and means for limting movement of said rod in the same direction during outward movement of said anvil to upset the rivet.

13. Apparatus for upsetting a hollow rivet having a threaded bore, said apparatus comprising a housing, a driving shaft within said housing, a driven shaft within said housing having threaded engagement with said driving shaft for effecting relative axial movement therebetween as a result of relative rotational movement thereof, a bit having driving engagement with said driven shaft and having a threaded end extending beyond said housing for engaging the threaded bore of a rivet, a non-rotatable anvil surrounding said rod in sliding engagement therewith and slideably mounted in said housing, spring means between said housing and said anvil normally holding said anvil in a retracted position, cooperating friction means in addition to said threaded engagement on said shafts for frictionally driving said driven shaft and said bit in a direction to enter the threaded end of said rod in the bore of the rivet and seat said rivet against said anvil, means effective upon contact of the rivet with said anvil and tensioning of said rod for overpowering said friction means and effecting an axial movement of said driven shaft and thereby said anvil against pressure of said spring means in a direction outwardly of said housing toward the rivet, and means for limiting movement of said rod in the same direction during outward movement of said anvil to upset the rivet.

RAY H. GILL.

REFERENCES CITED

The following references are of record in the file of this patent:

UNITED STATES PATENTS

| Number | Name | Date |
|---|---|---|
| 1,829,696 | Wylie et al. | Oct. 27, 1931 |
| 2,053,719 | Hock et al. | Sept. 8, 1936 |
| 2,069,907 | Waner | Feb. 9, 1937 |
| 2,170,323 | Gorshkoff | Aug. 22, 1939 |
| 2,283,665 | Cadden | May 19, 1942 |
| 2,283,708 | Trautmann | May 19, 1942 |
| 2,423,956 | Amsberg | July 15, 1947 |
| 2,423,957 | Amsberg | July 15, 1947 |

FOREIGN PATENTS

| Number | Country | Date |
|---|---|---|
| 451,396 | Great Britain | Aug. 5, 1936 |

Certificate of Correction

Patent No. 2,437,191. March 2, 1948.

RAY H. GILL

It is hereby certified that error appears in the printed specification of the above numbered patent requiring correction as follows: Column 12, line 20, for the words "for supporting and slideably" read *for slideably supporting and*; and that the said Letters Patent should be read with this correction therein that the same may conform to the record of the case in the Patent Office.

Signed and sealed this 25th day of May, A. D. 1948.

[SEAL]

THOMAS F. MURPHY,
*Assistant Commissioner of Patents.*